US010565478B2

(12) United States Patent
Alekseevich et al.

(10) Patent No.: US 10,565,478 B2
(45) Date of Patent: Feb. 18, 2020

(54) DIFFERENTIAL CLASSIFICATION USING MULTIPLE NEURAL NETWORKS

(71) Applicant: ABBYY Development LLC, Moscow (RU)

(72) Inventors: Zhuravlev Aleskey Alekseevich, Yaroslavl (RU); Vladimir Rybkin, Moscow (RU); Anisimovich Konstantin Vladimirovich, Moscow (RU); Davletshin Azat Aydarovich, Republic of Tatarstan (RU)

(73) Assignee: ABBYY PRODUCTION LLC, Moscow (RU)

( * ) Notice: Subject to any disclaimer, the term of this patent is extended or adjusted under 35 U.S.C. 154(b) by 104 days.

(21) Appl. No.: 15/625,894

(22) Filed: Jun. 16, 2017

(65) Prior Publication Data
US 2018/0349742 A1 Dec. 6, 2018

(30) Foreign Application Priority Data

May 30, 2017 (RU) .................................. 2017118749

(51) Int. Cl.
G06K 9/62 (2006.01)
G06N 3/08 (2006.01)
G06K 9/00 (2006.01)

(52) U.S. Cl.
CPC ....... *G06K 9/6267* (2013.01); *G06K 9/00442* (2013.01); *G06N 3/08* (2013.01)

(58) Field of Classification Search
CPC ........... G06K 2209/01; G06K 2209/25; G06K 9/4628; G06K 9/00463; G06K 9/325;
(Continued)

(56) References Cited

U.S. PATENT DOCUMENTS 5,052,043 A * 9/1991 Gaborski ................. G06K 9/66
382/157
5,271,068 A * 12/1993 Ueda .................... G06K 9/4609
382/156
(Continued)

OTHER PUBLICATIONS

F.N. Yasinsky et al., "Recognition of Large Number of Patterns with Using Neuronal Networks and Multiprocessor Systems", 2011, 4 pages.
(Continued)

*Primary Examiner* — Michael S Osinski
(74) *Attorney, Agent, or Firm* — Lowenstein Sandler LLP

(57) ABSTRACT

A classification engine stores a plurality of neural networks in memory, where each neural network is trained to recognize a set of confused graphemes from one or more sets of confused graphemes identified in recognition data for a plurality of document images. The classification engine receives an input grapheme image associated with a document image comprising a plurality of graphemes, determines a set of recognition options for the input grapheme image, wherein the set of recognition options comprises a set of target characters that are similar to the input grapheme image, selects a first neural network from the plurality of neural networks, wherein the first neural network is trained to recognize a first set of confused graphemes, and wherein the first set of graphemes comprises at least a portion of the set of recognition options for the input grapheme image, and determines a grapheme class for the input grapheme image using the selected first neural network.

20 Claims, 8 Drawing Sheets

(58) Field of Classification Search
CPC ............... G06K 9/344; G06K 9/00872; G06K 9/00879; G06T 2207/20084; G06T 2207/20081
See application file for complete search history.

(56) References Cited

U.S. PATENT DOCUMENTS

| | | | | |
|---|---|---|---|---|
| 5,442,715 | A * | 8/1995 | Gaborski | G06K 9/344 |
| | | | | 382/156 |
| 5,521,985 | A * | 5/1996 | Camp, Jr. | G06K 9/6835 |
| | | | | 382/161 |
| 5,542,006 | A * | 7/1996 | Shustorovich | G06K 9/32 |
| | | | | 382/156 |
| 5,835,633 | A | 11/1998 | Fujisaki et al. | |
| 6,026,177 | A | 2/2000 | Mong et al. | |
| 7,099,819 | B2 * | 8/2006 | Sakai | G06F 17/2755 |
| | | | | 704/1 |
| 7,756,871 | B2 * | 7/2010 | Yacoub | G06K 9/00463 |
| | | | | 707/736 |
| 8,009,928 | B1 * | 8/2011 | Manmatha | G06K 9/325 |
| | | | | 382/173 |
| 8,208,765 | B2 * | 6/2012 | Wu | G06F 17/30253 |
| | | | | 382/185 |
| 8,315,465 | B1 * | 11/2012 | Baluja | G06K 9/6257 |
| | | | | 382/156 |
| 8,478,045 | B2 * | 7/2013 | Sun | G06K 9/6224 |
| | | | | 345/467 |
| 8,761,514 | B2 | 6/2014 | Park et al. | |
| 9,141,874 | B2 * | 9/2015 | Krishna Kumar | G06K 9/4671 |
| 9,710,544 | B1 * | 7/2017 | Smith | G06T 11/206 |
| 9,734,567 | B2 * | 8/2017 | Zhang | G06T 7/0002 |
| 9,865,042 | B2 * | 1/2018 | Dai | G06T 5/10 |
| 10,007,866 | B2 * | 6/2018 | Criminisi | G06K 9/6257 |
| 10,115,036 | B2 * | 10/2018 | Zagaynov | G06K 9/3208 |
| 2002/0041713 | A1 * | 4/2002 | Imagawa | G06K 9/723 |
| | | | | 382/229 |
| 2003/0123732 | A1 * | 7/2003 | Miyazaki | G06K 9/00449 |
| | | | | 382/186 |
| 2005/0226517 | A1 * | 10/2005 | Kimura | G06K 9/6255 |
| | | | | 382/243 |
| 2006/0164420 | A1 * | 7/2006 | Cheng | G06F 17/211 |
| | | | | 345/467 |
| 2007/0172132 | A1 * | 7/2007 | Walch | G06K 9/00402 |
| | | | | 382/229 |
| 2009/0324107 | A1 * | 12/2009 | Walch | G06K 9/00872 |
| | | | | 382/224 |
| 2011/0078191 | A1 * | 3/2011 | Ragnet | G06F 17/30705 |
| | | | | 707/780 |
| 2012/0278341 | A1 * | 11/2012 | ogilvy | G06F 16/313 |
| | | | | 707/749 |
| 2015/0213330 | A1 * | 7/2015 | Chulinin | G06F 17/2863 |
| | | | | 382/185 |
| 2017/0004374 | A1 * | 1/2017 | Osindero | G06T 1/20 |
| 2017/0140240 | A1 * | 5/2017 | Socher | G06N 3/0445 |
| 2017/0235828 | A1 * | 8/2017 | Philipose | G06F 17/30784 |
| | | | | 725/115 |
| 2017/0372169 | A1 * | 12/2017 | Li | G06K 9/6202 |
| 2017/0372460 | A1 * | 12/2017 | Zagaynov | G06T 3/0031 |
| 2018/0018774 | A1 * | 1/2018 | Kacher | G06T 7/12 |
| 2018/0150448 | A1 * | 5/2018 | Gupta | G06F 17/273 |
| 2018/0150689 | A1 * | 5/2018 | Kimura | G06K 9/00456 |
| 2018/0150956 | A1 * | 5/2018 | Kao | G06T 7/11 |
| 2018/0240012 | A1 * | 8/2018 | Bhatt | G06N 3/08 |
| 2018/0285696 | A1 * | 10/2018 | Eigen | G06K 9/66 |
| 2018/0300295 | A1 * | 10/2018 | Maksak | G06F 17/30616 |
| 2018/0322339 | A1 * | 11/2018 | Cohen | G06K 9/00456 |
| 2018/0341702 | A1 * | 11/2018 | Sawruk | G06F 17/30743 |
| 2018/0341863 | A1 * | 11/2018 | Ding | G06F 17/278 |

OTHER PUBLICATIONS

L.K. Hansen et al., "Ensemble Methods for Handwritten Digit Recognition", Connect, Electronics Institute B349, The Technical University of Denmark, DK-2800 Lyngby Denmark, 1992, 10 pages.

* cited by examiner

DIFFERENTIAL CLASSIFICATION USING MULTIPLE NEURAL NETWORKS

CROSS REFERENCE TO RELATED APPLICATIONS

This application claims the benefit of priority to Russian patent application No. 2017118749, filed May 30, 2017; which is hereby incorporated by reference herein.

TECHNICAL FIELD

The present disclosure is generally related to computer systems, and is more specifically related to systems and methods for recognizing text in an image using neural networks.

BACKGROUND

Recognizing text in an image is one of the important operations in automated processing of images of natural language texts. Identifying graphemes from an image can be performed using deep neural networks. Accurately identifying and classifying graphemes from images of documents, however, can be complicated by neural networks that include a large number of layers. Additionally, each layer of such a neural network may be called up to analyze an image based on a large number of possible target graphemes. This can require significant resources in order to extract information accurately and in a timely manner.

SUMMARY OF THE DISCLOSURE

Embodiments of the present disclosure describe differential classification grapheme images using multiple neural networks. A classification engine stores a plurality of neural networks in memory, where each neural network is trained to recognize a set from one or more sets of confused graphemes identified in recognition data for a plurality of document images, wherein each set from the one or more sets of confused graphemes comprises a plurality of different graphemes that are graphically similar to each other. The classification engine receives an input grapheme image associated with a document image comprising a plurality of graphemes, determines a set of recognition options for the input grapheme image, wherein the set of recognition options comprises a set of target characters that are similar to the input grapheme image, selects a first neural network from the plurality of neural networks, wherein the first neural network is trained to recognize a first set of confused graphemes, and wherein the first set of graphemes comprises at least a portion of the set of recognition options for the input grapheme image, and determines a grapheme class for the input grapheme image using the selected first neural network.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
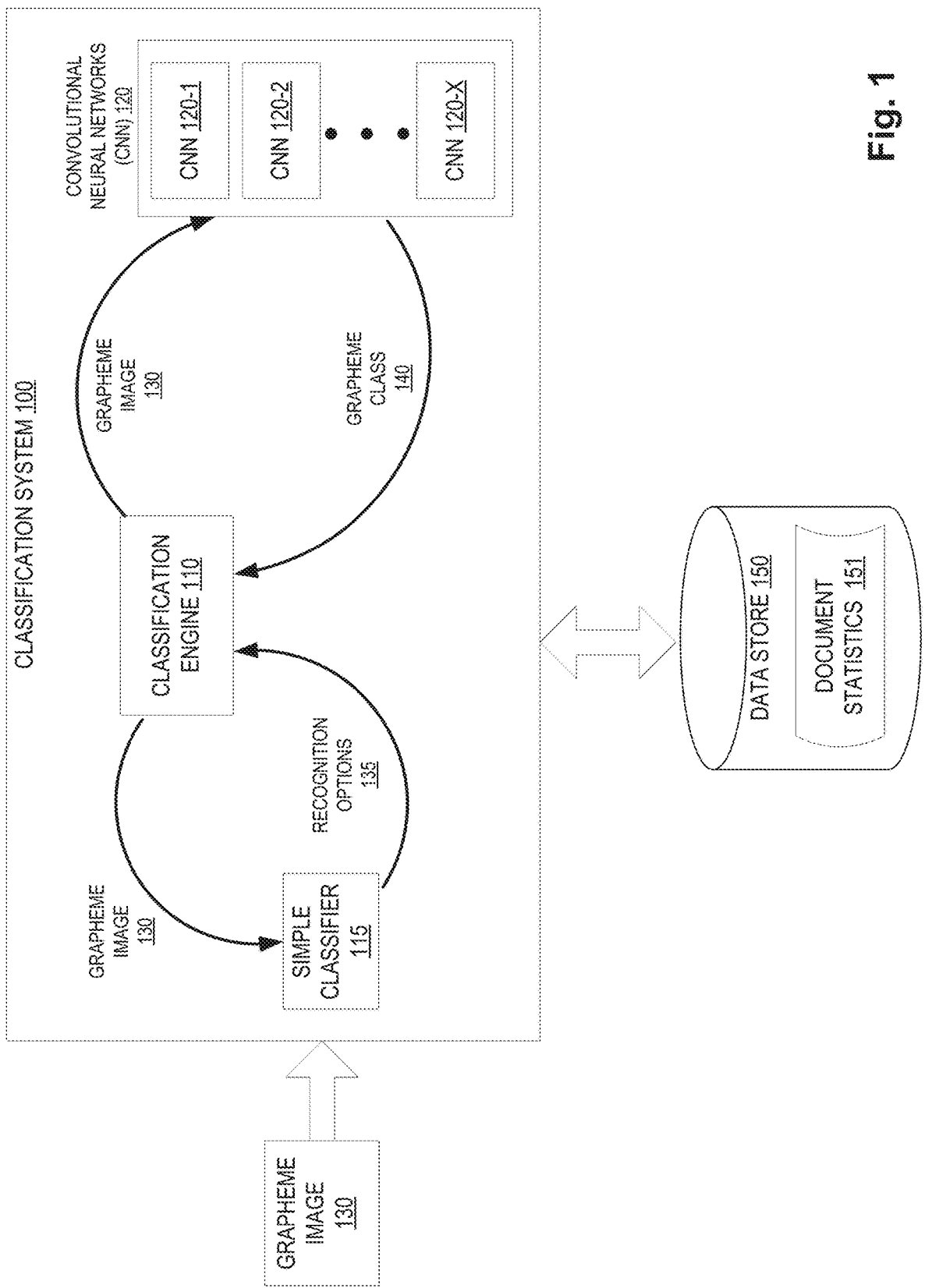
FIG. 1 depicts a high-level diagram of an example classification system, in accordance with one or more aspects of the present disclosure.

Described herein are methods and systems for differential classification of grapheme images using multiple neural networks. Recognizing text in an image may be performed with the use of classifiers. Some classifiers can generate a complete set of probable recognition hypotheses for a grapheme in an image. The results generated by such classifiers, however, can typically suffer from a lack of precision. To improve precision, differential classifiers are often used to more accurately recalculate the confidence level of various possible options for a grapheme in an image. In many conventional implementations, convolutional neural networks (CNNs) may be used to recalculate the confidence level of each option and sort the list of options to improve the precision of the results. CNNs, however, are typically implemented as deep neural networks that are designed to classify all graphemes from a fixed alphabet. While such an approach can yield results with high quality recognition, these types of CNN architectures can involve significant processing resources to produce expected results. Conventional hardware implementations can result in significant increases in processing time, which may sometimes only be solved with dedicated recognition servers equipped with powerful graphics processors, which can dramatically increase system costs.

Aspects of the present disclosure address the above noted and other deficiencies by configuring and employing multiple differential classifiers that each include fewer CNN layers as opposed to a single deep neural network with a large number of CNN layers. Sets of graphemes are generated based on statistical analysis of the recognition data (i.e. various recognition options/hypothesis and their confidence levels for each grapheme image within each document image) for stored document images. Each set can include the graphemes that are most commonly confused with each other based on the statistical data. Each set may be assigned to a particular CNN that may be trained to recognize only the graphemes included in its assigned set as opposed to the entire alphabet. With a smaller number of graphemes in a set that need to be differentiated, fewer features are needed to isolate one grapheme from another. Accordingly, a simpler neural network structure may be employed to handle analysis of an entire alphabet (or multiple alphabets) by dividing the graphemes for the alphabet across multiple neural networks.

Aspects of the present disclosure are thus capable of more efficiently identifying text in an image using significantly fewer computing resources. By utilizing multiple CNNs that are configured with fewer layers, the process may be implemented on conventional hardware rather than specialized graphics processing engines. Additionally, by reducing the complexity of the neural networks, the processing time required to identify a grapheme from an image can be substantially reduced. Moreover, by using sets of commonly confused graphemes for each CNN, new languages or new sets of graphemes may be added to the system without the need for substantial redesign of the neural networks or the need for additional hardware resources. New sets of confused graphemes could be generated for a new language, and the CNNs could be automatically retrained to accommodate the new sets of confused graphemes without system architecture redesign.

FIG. 1 depicts a high-level system diagram of an example classification system 100 in accordance with one or more aspects of the present disclosure. The classification system 100 may include a classification engine 110 that interacts with simple classifier 115 and one or more convolutional neural networks (CNN) 120 (e.g., CNN 120-1 through 120-X). The classification engine 110 may be a client-based application or may be a combination of a client component and a server component. In some implementations, classification engine 110 may execute entirely on the client computing device such as a tablet computer, a smart phone, a notebook computer, a camera, a video camera, or the like. Alternatively, a client component of classification engine 110 executing on a client computing device may receive a document image and transmit it to a server component of the classification engine 110 executing on a server device that performs the grapheme classification. The server component of the classification engine 110 may then return a grapheme class to the client component of the classification engine 110 executing on the client computing device for storage or to provide to another application. In other implementations, classification engine 110 may execute on a server device as an Internet-enabled application accessible via a browser interface. The server device may be represented by one or more computer systems such as one or more server machines, workstations, mainframe machines, personal computers (PCs), etc.

In an illustrative example, classification system 100 may be configured to identify and classify grapheme images 130 using multiple convolutional neural networks (CNN) 120. In some implementations, a CNN (such as CNNs 120-1 through 120-X) may be a specialized neural network architecture directed to efficient image recognition. Each CNN may include a sequence of layers, where each layer is of a different type. The layers may include, for example, convolutional layers, pooling layers, rectified linear unit (ReLU) layers, and fully connected layers, each of which perform a particular operation in identifying an image. In such a network, an original image is passed through a series of these layers and an output is generated from the final layer that classifies the image. Each layer may be a different type than the immediately preceding layer and immediately following layer. The output of one layer may be provided as the input to the next layer. In various embodiments of the present disclosure, each CNN 120 may be configured to identify whether or not an input grapheme image is associated with a particular class of graphemes based on its graphical similarity to other known graphemes (e.g., the grapheme class that best describes the grapheme image).

In some implementations, a grapheme represents the smallest recognizable unit in a writing system of a given language (or set of similar languages). A grapheme can include alphabetic letters, typographic ligatures, Chinese characters, numerical digits, punctuation marks, or other individual symbols or characters. Each CNN 120 may be configured to analyze and classify whether an input grapheme image is one of a particular set of graphemes, and subsequently output a grapheme class associated with the input grapheme image. In some implementations, a grapheme class may be an identifier that is associated with the character most likely represented by the input grapheme image. For example, given a set of European style languages (e.g., languages written from left to right where characters are separated by gaps), a grapheme of an English "A" and a grapheme of a Russian "A", while different characters, may be classified as the same grapheme class.

In one embodiment, the classification engine 110 may configure the multiple CNNs 120 by first analyzing the recognition data for a group of document images (e.g., document images stored in data store 150) to identify one or more sets of confused graphemes. Alternatively rather than analyze the recognition data for the document images, classification engine 110 may receive the one or more sets of confused graphemes from another component of classification system 100 that conducts the analysis. In some implementations, a set of confused graphemes can include a group of different graphemes that may often be confused with each other (e.g., graphemes that are graphically similar to each other). For example, in one embodiment, given an input grapheme image that corresponds to the character "C", a set of confused graphemes may include "C," "e," "6," "0," "Q," "G," etc. In some implementations, a set of confusing graphemes may be determined by using statistical information associated with the recognition data for group of document images (e.g., document statistics 151) that describes graphemes that have been commonly confused with each other based on character recognition hypotheses that were generated during OCR of the group of document images.

For example, if a stored document image had been processed using optical character recognition (OCR), the process may have used a simple classifier (e.g., simple classifier 115) to identify various recognition options (e.g., hypothesis) for each grapheme within the stored document image. A simple classifier can include any type of classifier component or subsystem that can receive an input grapheme image and generate one or more hypotheses about what the input grapheme image may be. For example, the simple classifier may be a Naïve Bayes classifier, a decision tree classifier, or the like. In some implementations, the simple classifier is configured as a simple probabilistic classifier where the classification process is based on the assumption of independence of the effect on the probability of various features of the input grapheme image. Thus, this type of classifier includes simplified calculations, and as a result, can execute much more quickly than deeper neural network implementations.

In some implementations, the simple classifier (or other process used in analyzing the group of stored document images) may have stored the different hypothesis for each grapheme within document statistics 151 for later use. An illustrative example of different hypotheses for a grapheme is depicted below with respect to FIG. 2. In one embodiment, the statistics 151 may be analyzed to identify pairs of graphemes that are commonly confused with each other within the group of stored document images (e.g., when performing OCR of the stored document images) to establish a set of confused graphemes. In some implementations, a weighted graph may be constructed that associates pairs of confused graphemes with each other based on the number of occurrences of each pair based on the stored statistics. An illustrative example of determining a set of confused graphemes using a weighted graph is described below with respect to FIG. 3. An illustrative example of a resulting set of confused graphemes is described below with respect to FIG. 4.

Once the one or more sets of confused characters have been identified, classification engine 110 may then configure and store the CNNs 120 such that each CNN 120 is trained to recognize a particular set of confused graphemes identified in recognition data for the plurality of document images described above. For example, CNN 120-1 may be trained to recognize one set of confused graphemes, CNN 120-2 may be trained to recognize a second set of confused graphemes, and CNN 120-X may be trained to recognize the Xth set of confused graphemes, where "X" represents the number of sets. In some implementations, the classification engine 110 may train each CNN 120 by initiating a "training" process to train the CNN to recognize its assigned set of confused graphemes. Each CNN 120 may be separately trained to recognize images of graphemes for its assigned set. Each CNN may be trained using BackPropagation (e.g., backward propagation of errors), or other similar neural network training method. In various embodiments, each CNN may be configured with different numbers of layers (convolutional, pooling, ReLU, etc.) based upon the size or contents of its assigned set of confused graphemes. Thus, a set of confused graphemes that are more graphically similar (and thus may be confused far more frequently than graphemes in other sets) may be assigned to a CNN 120 with a greater number of layers to improve analysis results and performance.

Once each CNN 120 has been configured and trained, classification engine 110 may invoke the CNNs 120-1 through 120-X to classify received grapheme images. In one embodiment, classification engine 110 may receive a grapheme image 130. Grapheme image 130 may be received as a portion of a document image, or as a single grapheme image from a client device or an application that communicates with classification system 100. Classification engine 110 may then invoke simple classifier 115 to determine a set of recognition options 135 for grapheme image 130. As noted above, simple classifier 115 may be a simple probabilistic classifier that can quickly identify the most likely recognition options 135 for the input grapheme image 130. In some implementations, simple classifier 115 may identify a set of target characters that are most similar to the input grapheme image 130. In one embodiment, simple classifier 115 may determine one or more target characters that have graphical characteristics or features that are similar to the input grapheme image 130 and assign those target characters to the set of recognition options.

In some implementations, simple classifier 115 may additionally determine a confidence level associated with each of the target characters that make up the recognition options 135. In one embodiment, the confidence level for each target character in recognition options 135 may be a probability percentage value for that target character. For example, if simple classifier 115 analyzed grapheme 130 and determined that there was a 70% probability that input grapheme image 130 was a "C", the associated confidence level may be represented by the 70% value. Simple classifier 115 may return the entire set of recognition options 135 to classification engine 110. In some implementations, classification engine 110 may then sort the target characters in the set of recognition options 135 by the associated confidence level and select those target characters that have an associated confidence level that meets a threshold value. For example, classification engine 110 may retain those target characters in recognition options 135 that have an associated confidence level of over 70%. In some implementations, classification engine 110 may then sort the target characters in the set of recognition options 135 by the associated confidence level and select the top-N target characters with the highest measured confidence level, where N represents a predetermined threshold number of characters to select.

Classification engine 110 may subsequently use recognition options 135 to select one of the CNNs 120 to further classify the grapheme image 130. In some implementations, the selected CNN 120 may be configured to recognize a particular set of confused graphemes, where that set of confused graphemes includes at least a portion of the recognition options 135 that were returned by simple classifier 115 for grapheme 130. In one embodiment, classification engine 110 may select the CNN 120 by comparing the set of recognition options 135 to each of the sets of confused graphemes associated with CNNs 120. Classification engine 110 may then determine an intersection between the set of recognition options and each of the sets of confused graphemes, and select the particular set of confused graphemes where the intersection is greater than that of any other set of confused graphemes. In other words, classification engine 110 may select the set of confused graphemes that includes more of the target characters included in recognition options 135 than any other set of confused graphemes associated with the CNNs 120. Thus, the CNN 120 that has been trained to recognize and classify more of the recognition options than any other CNN 120 may be selected to classify the grapheme image 130.

In some implementations, classification engine 110 may take the confidence levels of the recognition options into account when selecting a set of confused graphemes for a CNN. For example, when classification engine 110 may first select a subset of the recognition options where the subset includes the recognition options with the highest levels of confidence. Thus, when classification engine 110 determines the intersection described above, the set of confused graphemes may be selected that includes more of the target characters included in the subset of recognition options (e.g., the recognition options with the highest levels of confidence). For example, given a set of recognition options ranked 1 to 5 (1 being the highest level of confidence, and 5 being the lowest), the classification engine 110 may determine the intersection between the sets of confused graphemes and the target characters that are ranked between 1 and 2. Thus, a set of confused graphemes that includes target characters with confidence levels of 1 and 2 may be selected over a set of confused graphemes that includes target characters with confidence levels between 2 and 5.

Classification engine 110 may then determine a grapheme class for the input grapheme image 130 using the selected CNN 120. In some implementations, classification engine may make this determination by invoking the selected CNN 120 to classify the grapheme image 130. As noted previously, the CNN 120 may have been previously trained to recognize a particular set of commonly confused graphemes using multiple convolutional layers. Once the grapheme class 140 has been identified by the CNN 120, classification engine 110 may store the grapheme class 140 in data store 150, provide the grapheme class 140 to the calling program or system component, provide the grapheme class to another system component for more detailed image recognition analysis, or the like.

Figure 2:
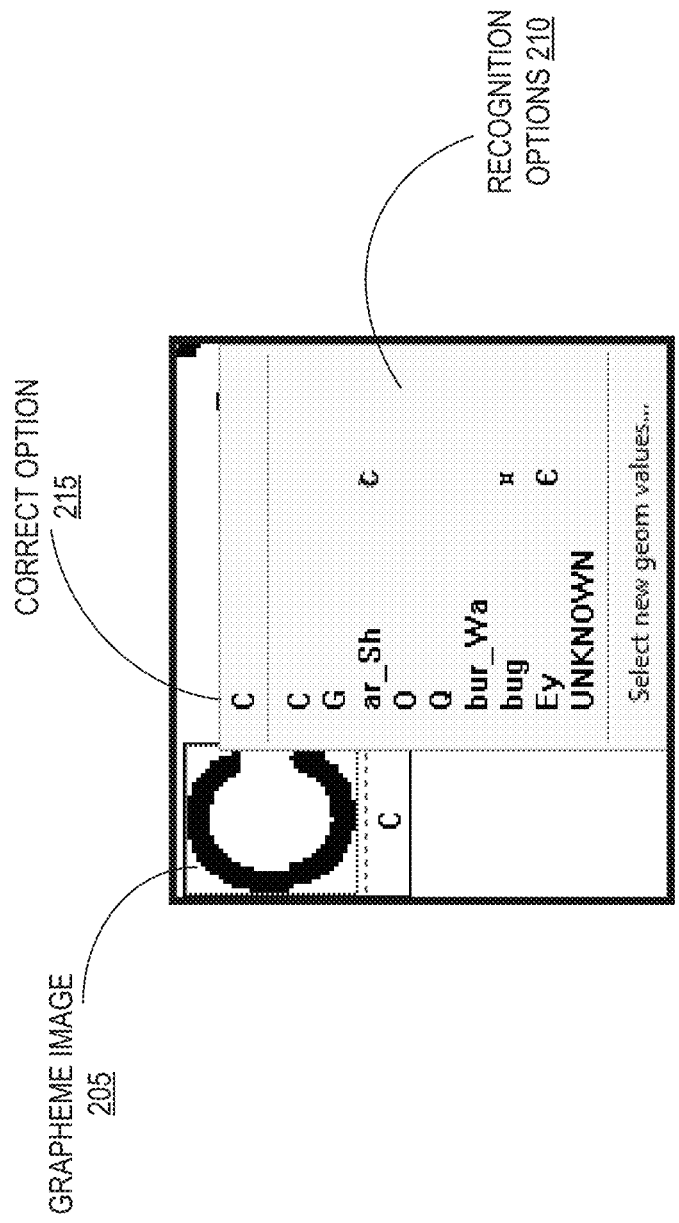
FIG. 2 illustrates an example of recognition options for an input grapheme image that may be produced by a simple classifier, in accordance with one or more aspects of the present disclosure.

FIG. 2 illustrates an example of recognition options for an input grapheme image that may be produced by a simple classifier. In some implementations, the recognition options illustrated in FIG. 2 may be determined using simple classifier 115 of FIG. 1. As shown in FIG. 2, grapheme image 205 may be provided to the simple classifier as input. The simple classifier may then use probabilistic analysis as described above to identify recognition options 210. In some implementations, the simple classifier may analyze grapheme image 205 and determine one or more target characters with characteristics that are most similar to grapheme image 205. As shown in FIG. 2, grapheme image 205 is the character "C". The simple classifier analyzes the grapheme 205 and determines that the most probable target characters that are most similar to grapheme 205 include "C," "G," "ar_Sh," "O," "Q," etc. Thus, recognition options 210 include the target characters identified by the simple classifier. In some implementations, the simple classifier may additionally determine a confidence level for each of the probable target characters and sort them by confidence level. In such cases, the recognition options 210 may be selected to include only those target characters whose associated confidence level meets a threshold value. For example, if a threshold confidence level is set to 75%, only those target characters with an associated confidence level of 75% or greater may be selected as part of the set of recognition options.

Figure 3:
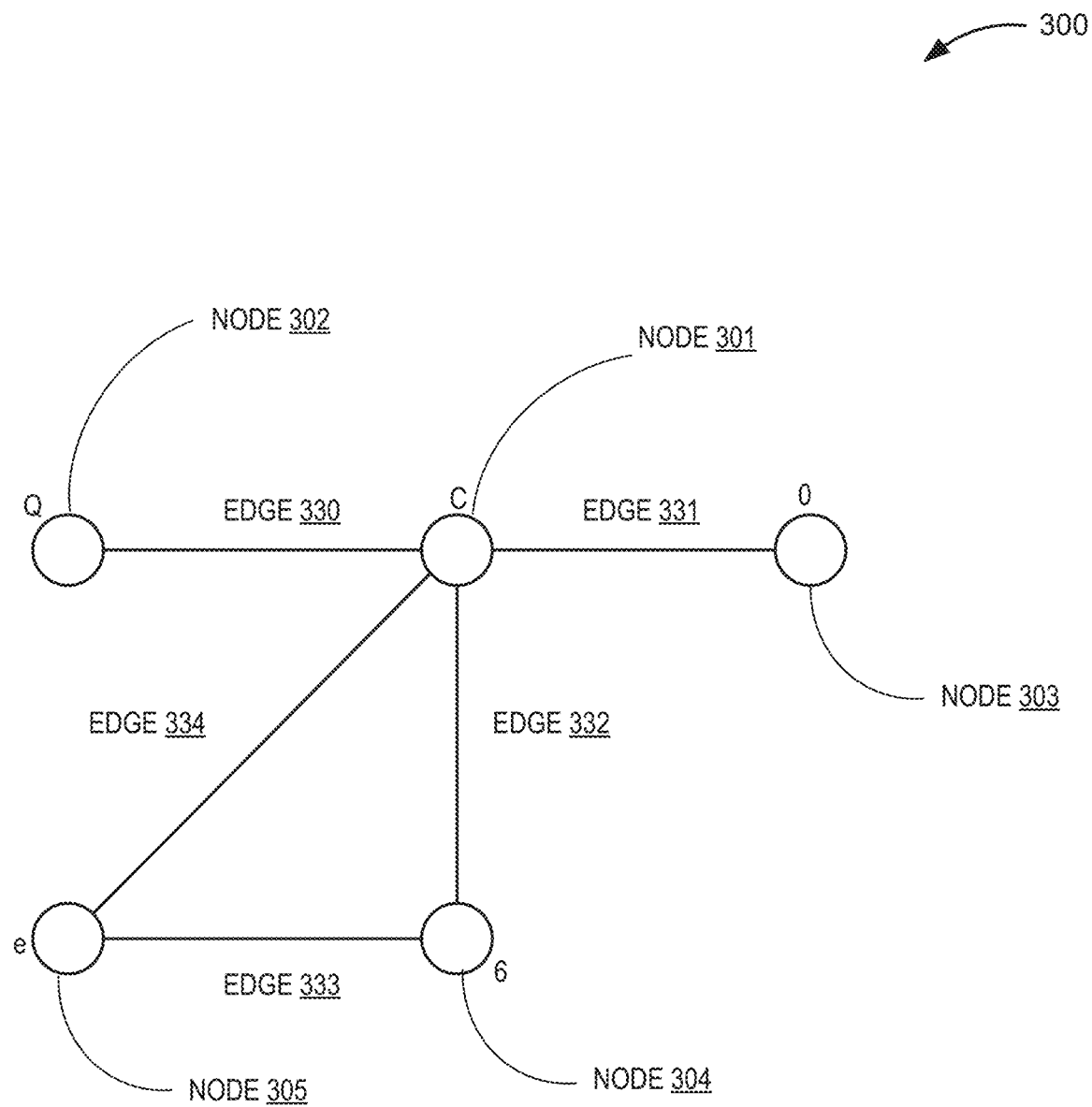
FIG. 3 illustrates an example of a weighted graph that can be used for determining a set of confused graphemes, in accordance with one or more aspects of the present disclosure.

FIG. 3 illustrates an example of a weighted graph 300 that can be used for determining a set of confused graphemes, in accordance with one embodiment. In some implementations, the weighted graph 300 may be generated by a classification engine, such as classification engine 110 of FIG. 1. As described above with respect to FIG. 1, the classification engine may analyze stored statistics related to graphemes in the group of stored document images. In some implementations, the classification engine may use the stored statistics to identify pairs of graphemes that are graphically similar to each other. In one embodiment, the classification engine may utilize the output of a simple classifier that identifies recognition options for an input grapheme image and stores associations between the input grapheme image and each of the recognition options identified by the simple classifier.

Using the stored statistics, the classification engine may construct weighted graph 300, where each node of the graph represents a grapheme from the statistical data and each edge in the graph that connects two nodes represents the number of occurrences for the pair connected by that edge. As shown in FIG. 3, weighted graph 300 includes nodes 301, 302, 303, 304, and 305, with connected edges 330, 331, 332, 333, and 334. Node 301 corresponds to the grapheme "C", node 302 corresponds to the grapheme "Q", node 303 corresponds to the grapheme "0", node 304 corresponds to the grapheme "6", and node 305 corresponds to the grapheme "e". Also as shown in FIG. 3, edge 331 represents the weight of the pair defined by nodes 301 and 303 (e.g., the number of occurrences that "C" and "0" were identified as associated recognition options in the stored statistics). Similarly, edges 330, 332, 333, and 334 represent the weight of the pairs defined by their connected nodes.

In some implementations, the classification engine can traverse the weighted graph 300 to identify a set of confused characters to be assigned to a CNN for use with classifying input grapheme images. In one embodiment, the classification engine can traverse the weighted graph 300 according to the greedy algorithm principle. A greedy algorithm is an algorithmic paradigm that makes a locally optimal choice at each stage of its analysis with the objective of finding a global optimum for the set of confused graphemes.

In an illustrative example, the classification engine may first determine a set size for the set of confused characters and a total number of sets to identify. The set size and total number of sets may be predetermined parameters, determined based on analysis of the statistical data, received from a user, or may be determined in any other manner. In one embodiment the total number of sets may be based on a ratio of the weights of the sets as they are created. Thus, in such embodiments, the total number of sets may be dynamically determined as each set is created.

In some implementations, the classification engine may identify the edge in the graph that has the largest weight value (e.g. the "heaviest" edge). The edge with the largest weight value represents the most commonly encountered pair of graphemes that are confused with each other based on the stored recognition options. The graphemes associated with the nodes connected by the heaviest edge may then be selected for the set of confused graphemes. For example, if edge 331 represented the edge with the largest number of occurrences for its associated nodes (graphemes "C" and "0" were most commonly associated with each other), then edge 331 would be identified as the "heaviest" edge. The graphemes "C" (node 301) and "0" (node 303) would be added to the set of confused graphemes.

The classification engine may then identify the node in the weighted graph that is connected to one or both nodes already identified, where the sum of the weighted value of those connected edges is greater than that for any other node in the graph. The grapheme associated with this node may then be added to the set. For example, given that nodes 301 and 303 have already been selected, the next eligible node would be a node that is connected to one or both of nodes 301 and 303 where the sum of its edges is greater than that for any other node. As shown in FIG. 3, no other node is connected to node 303, so the classification engine may select the node that is connected to node 301 whose edge is greater than the edge of any other node connected to node 301. Nodes 302, 304 and 305 are all connected to node 301. Thus, if edge 332 has the greatest weight, then node 304 may be selected for the set. Similarly, if edge 330 has the greatest weight, then node 302 may be selected, and so on.

The classification engine may then repeat the process, identifying the next unselected node that is connected to at least one of the already selected nodes where the sum of the edges connecting the unselected node to the selected nodes is the greatest. For example, assuming nodes 301, 303, and 304 have already been selected, node 305 may be selected if the sum of edges 333 and 334 is greater than the value for edge 330. In some implementations, this process is repeated until the desired set size is achieved. When the desired set size is achieved, the classification engine may update the weighted graph 300 to remove the edges from the weighted graph that connect the nodes associated with the graphemes selected for the set. The process may then be repeated to construct additional sets of confused graphemes based on the remaining edges in the weighted graph 300.

Although, for simplicity, the weighted graph 300 of FIG. 3 is described as being used to generate a single set of confused graphemes, it should be noted that in other implementations, a single weighted graph may be used to generated multiple sets of confused graphemes.

Figure 4:
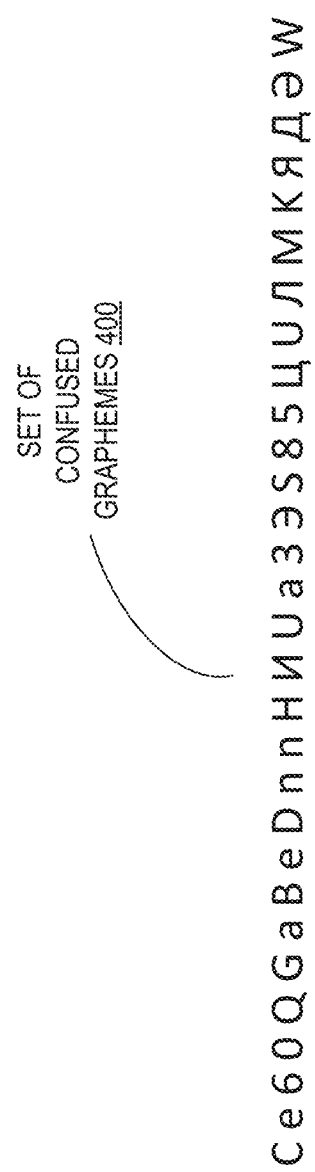
FIG. 4 illustrates an example of a set of confusing graphemes, in accordance with one or more aspects of the present disclosure.

FIG. 4 illustrates an example of a set of confusing graphemes 400, in accordance with one embodiment. As shown in FIG. 4, the set of confused graphemes 400 includes a collection of graphemes that are commonly confused with each other. The set of confused graphemes 400 includes a graphemes corresponding to the European family of languages. In one embodiment, the set of confused graphemes 400 may be generated by traversing a weighted graph as described above with respect to FIG. 3.

Figure 5:
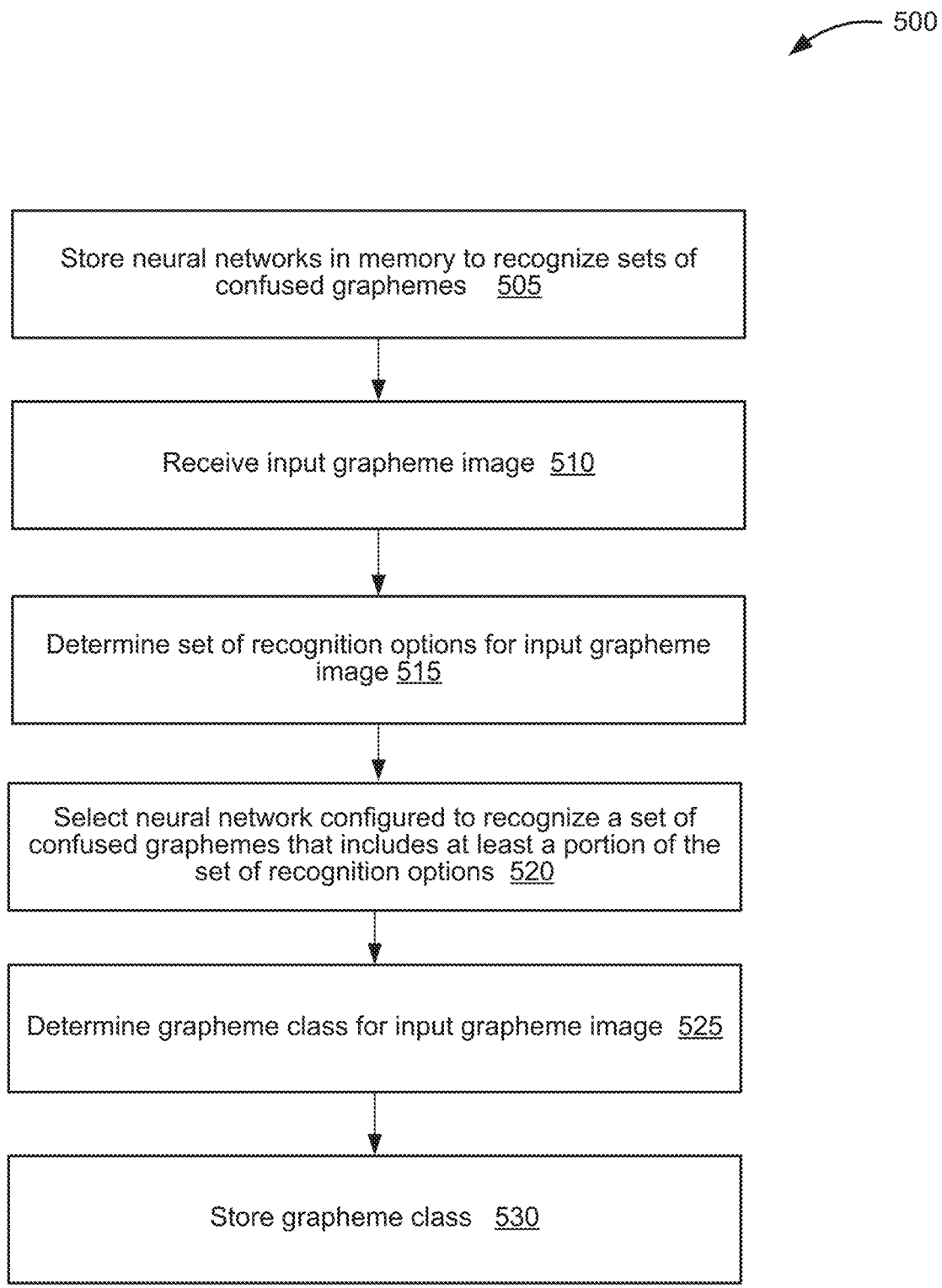
FIG. 5 depicts a flow diagram of a method for determining a grapheme class using multiple convolutional neural networks, in accordance with one or more aspects of the present disclosure.
Figure 6:
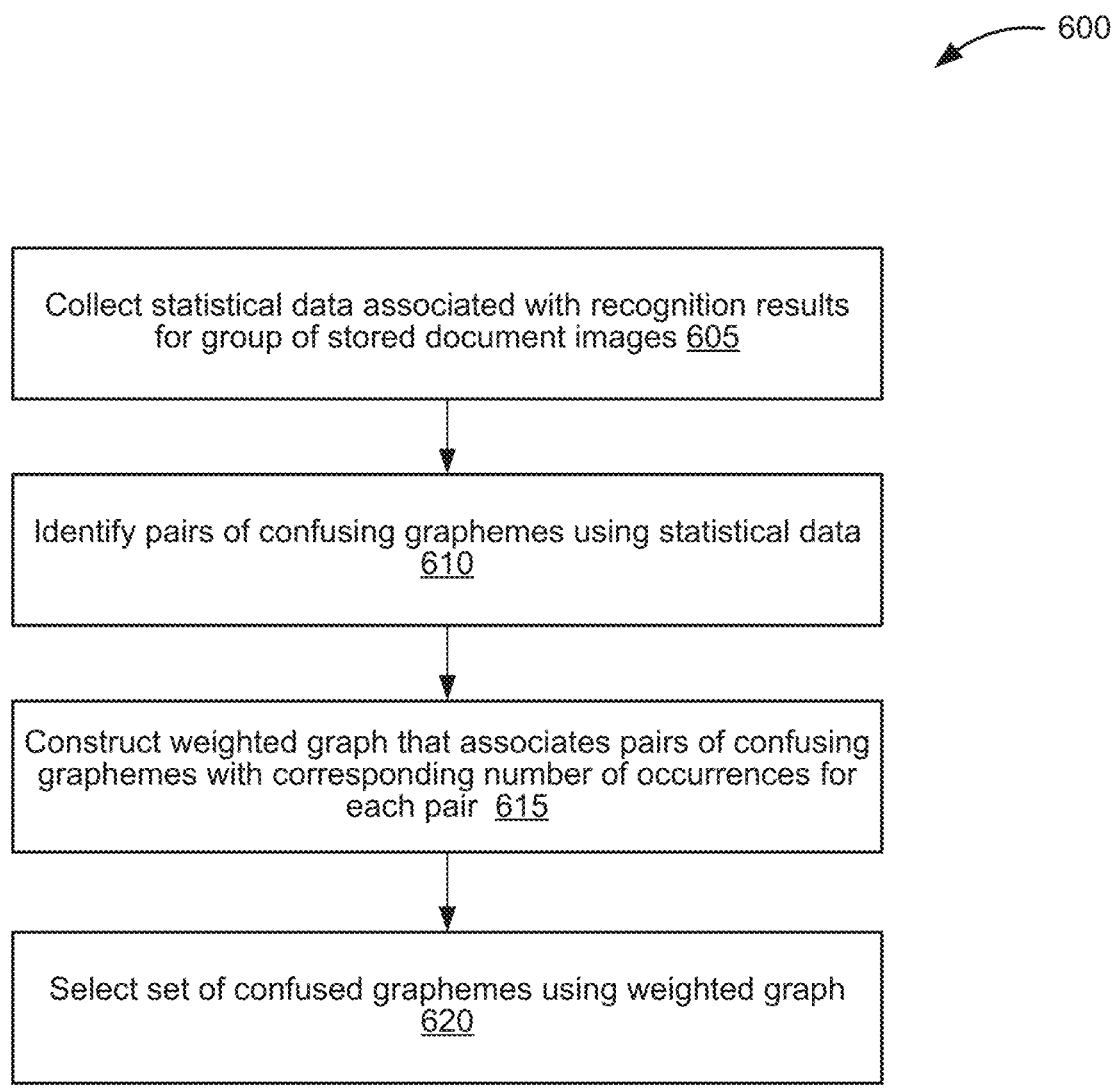
FIG. 6 depicts a flow diagram of a method for identifying a set of confused graphemes, in accordance with one or more aspects of the present disclosure
Figure 7:
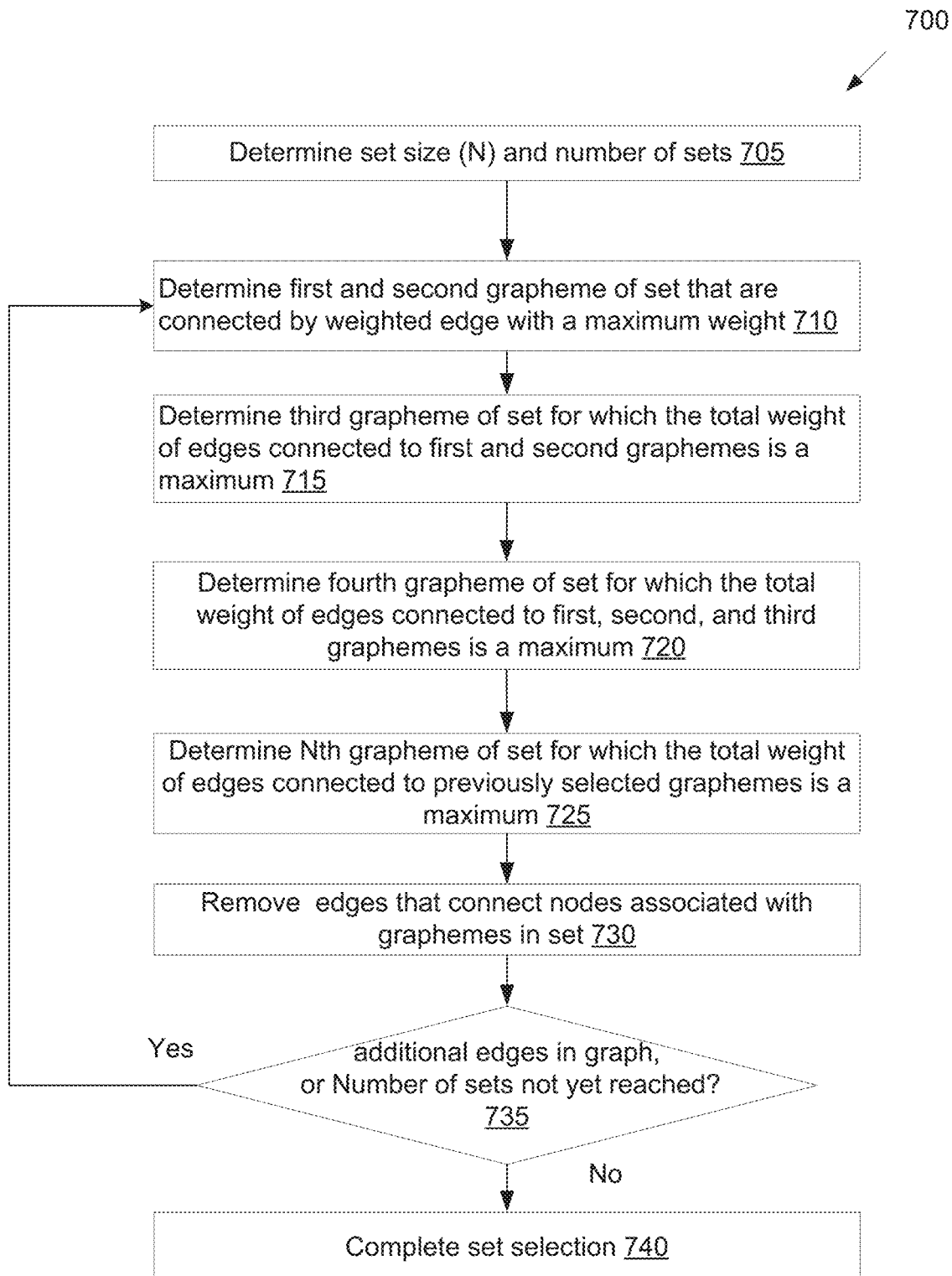
FIG. 7 depicts a flow diagram of a method for selecting sets of confused graphemes using a weighted graph, in accordance with one or more aspects of the present disclosure

FIGS. 5-7 are flow diagrams of various implementations of methods related to determining a grapheme class for an input grapheme image using multiple convolutional neural networks. The methods are performed by processing logic that may include hardware (circuitry, dedicated logic, etc.), software (such as is run on a general purpose computer system or a dedicated machine), or a combination of both. The methods and/or each of their individual functions, routines, subroutines, or operations may be performed by one or more processors of a computing device (e.g., computing system 800 of FIG. 8) implementing the methods. In certain implementations, the methods may be performed by a single processing thread. Alternatively, the methods may be performed by two or more processing threads, each thread implementing one or more individual functions, routines, subroutines, or operations of the methods. Some methods may be performed by a classification engine such as classification engine 115 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 depicts a flow diagram of an example method 500 for determining a grapheme class using multiple convolutional neural networks. At block 505 of method 500, processing logic stores a plurality of neural networks in memory, where each neural network of the plurality of neural networks is trained to recognize a set of confused graphemes from one or more sets of confused graphemes identified in a plurality of document images, wherein the set of confused graphemes comprises a plurality of different graphemes that are graphically similar to each other. In some implementations, each neural network is trained to recognize a different set of confused graphemes from one or more sets of confused graphemes. In an illustrative example, processing logic may identify sets of confused graphemes as described below with respect to FIG. 6.

At block 510, processing logic receives an image of an input grapheme image. At block 515, processing logic determines a set of recognition options for the input grapheme image. At block 520, processing logic selects a first neural network from the plurality of neural networks, where the first neural network is configured to recognize a first set of confused graphemes that includes at least a portion of the set of recognition options determined at block 515. At block 525, processing logic determines a grapheme class for the input grapheme image using the first neural network selected at block 520. At block 530, processing logic stores an association between the grapheme class and the input grapheme image. After block 530, the method of FIG. 5 terminates.

FIG. 6 depicts a flow diagram of an example method 600 for identifying a set of confused graphemes. At block 605 of method 600, processing logic collects statistical data associated with recognition data of a group of stored document images. At block 610, processing logic identifies pairs of confusing graphemes using the statistical data. At block 615, processing logic constructs a weighted graph that associates pairs of confusing graphemes with a corresponding number of occurrences for each pair. At block 620, processing logic selects a set of confused graphemes using the weighted graph. In an illustrative example, processing logic may select a set of confused graphemes using a weighted graph as described below with respect to FIG. 7. After block 630, the method of FIG. 6 terminates.

FIG. 7 depicts a flow diagram of an example method 500 for selecting sets of confused graphemes using a weighted graph. At block 705 of method 700, processing logic determines a set size (N), where N is a positive integer, and a total number of sets for the sets of confused graphemes. At block 710, processing logic determines a first and second grapheme for the set whose associated nodes in the weighted graph are connected by a weighted edge with a maximum weight in relation to other weighted edges in the weighted graph. At block 715, processing logic determines a third grapheme for the set whose associated node in the weighted graph is connected to the nodes of the first and second graphemes by weighted edges whose sum is maximum in relation to other nodes in the weighted graph. In some embodiments, the node of the third grapheme may be connected to both of the nodes associated with the first and second grapheme. In other embodiments, the node of the third grapheme is connected to at least one of the node associated with the first grapheme and the node associated with the second grapheme (but not necessarily both).

At block 720, processing logic determines a fourth grapheme for the set whose associated node in the weighted graph is connected to the nodes of the first, second, and graphemes by weighted edges whose sum is maximum in relation to other nodes in the weighted graph. In some embodiments, the node of the fourth grapheme may be connected to each of the nodes associated with the first, second, and third grapheme. In other embodiments, the node of the fourth grapheme is connected to at least one of the nodes associated with the first, second, and third graphemes (but not necessarily each of them).

At block 725, processing logic may determine an Nth (where N is the set size determined at block 705) grapheme for the set whose associated node in the weighted graphed is connected to the nodes of the previously selected graphemes by weighted edges whose sum is maximum in relation to other nodes in the weighted graph. In some implementations, the process described with respect to blocks 715-720 may be repeated until the Nth grapheme is identified to complete the set size of N. Although for simplicity of illustration FIG. 7 describes the process for selecting at least 4 graphemes, it should be noted that the set size may be set to a number less than 4.

At block 730, processing logic completes the set by removing the weighted edges in the weighted graph that connect the nodes associated with the graphemes selected for the set in blocks 710-725. At block 735, processing logic branches based on whether there are additional weighted edges in the weighted graph to be analyzed, or the number of sets has not been reached (e.g., there are additional sets to be generated). If there are additional sets to be generated, processing returns to block 710 to repeat the process for the next set of confused graphemes. Otherwise, processing proceeds to block 740 where set selection is completed for the group of sets. After block 740, the method of FIG. 7 terminates.

Figure 8:
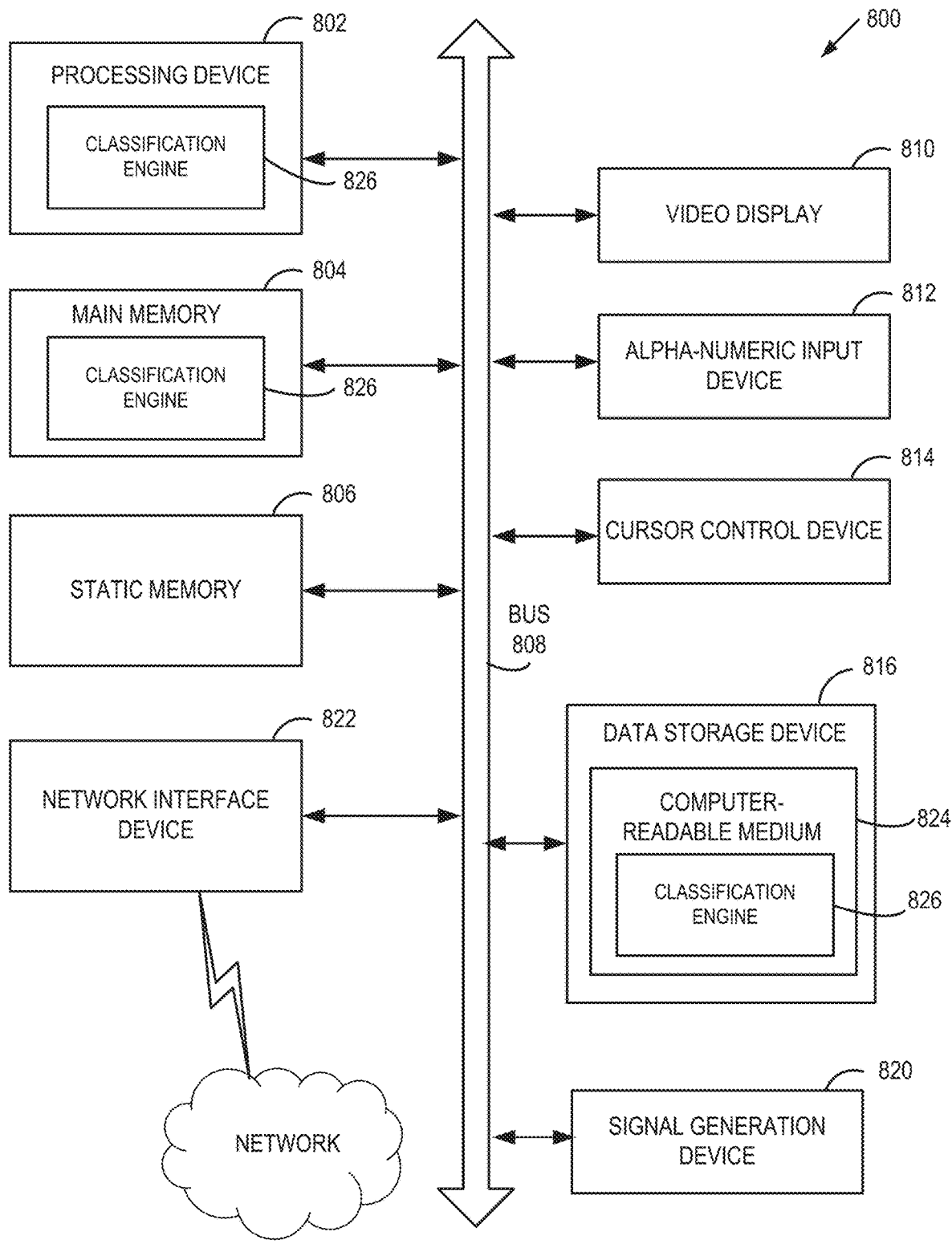
FIG. 8 depicts a block diagram of an illustrative computer system operating in accordance with examples of the present disclosure.

FIG. 8 depicts an example computer system 800 which can perform any one or more of the methods described herein. In one example, computer system 800 may correspond to a computing device capable of executing classification engine 110 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute classification engine 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored classification engine 826 (e.g., corresponding to the methods of FIGS. 5-7, etc.) embodying any one or more of the methodologies or functions described herein. Classification engine 826 may also reside, completely or at least partially, within the main memory 804 and/or within the processing device 802 during execution thereof by the computer system 800, the main memory 804 and the processing device 802 also constituting computer-readable media. Classification engine 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   analyzing a plurality of document images to construct a weighted graph that associates a plurality of pairs of confusing graphemes with a corresponding number of occurrences for each pair;
   generating, using the weighted graph, a plurality of sets of confused graphemes based on recognition data for the plurality of document images, wherein each set of confused graphemes from the plurality of sets of confused graphemes comprises a plurality of different graphemes that are graphically similar to each other;
   storing a plurality of neural networks in memory, wherein each neural network of the plurality of neural networks is trained to recognize a set of confused graphemes from the plurality of sets of confused graphemes;
   receiving an input grapheme image associated with a document image comprising a plurality of grapheme images;
   determining a set of recognition options for the input grapheme image, wherein the set of recognition options comprises a set of target characters that are similar to the input grapheme image;
   selecting, by a processing device, a first neural network from the plurality of neural networks, wherein the first neural network is trained to recognize a first set of confused graphemes, and wherein the first set of confused graphemes comprises at least a portion of the set of recognition options for the input grapheme image; and
   determining a grapheme class for the input grapheme image using the selected first neural network.

2. The method of claim 1, wherein analyzing the plurality of document images further comprises:
   collecting statistical data associated with the recognition data for the plurality of document images;
   identifying the plurality of pairs of confusing graphemes using the statistical data, wherein a first pair of confusing graphemes of the plurality of pairs comprises a first grapheme and a second grapheme that are graphically similar; and
   selecting a first set of confused graphemes using the weighted graph.

3. The method of claim 2, wherein selecting the first set of confused graphemes using the weighted graph comprises:
   determining a set size for each of the plurality of sets of confused graphemes;
   determining a first weighted edge with a greatest weight value;
   identifying a first pair of connected nodes that are connected by the first weighted edge;
   selecting, for the first set of confused graphemes, the graphemes associated with the first pair of connected nodes; and
   responsive to determining that a number of selected graphemes has not met the set size:
     identifying an additional node that is connected at least one of the nodes associated with the first pair of connected nodes, and
     selecting, for the set of confused graphemes, the grapheme associated with the additional node.

4. The method of claim 1, further comprising:
   training each neural network of the plurality of neural networks to recognize a corresponding set of confused graphemes.

5. The method of claim 1, wherein determining the set of recognition options for the input grapheme image comprises:
- analyzing the input grapheme image using a simple classifier;
- determining one or more target characters with characteristics that are similar to the input grapheme image; and
- assigning the one or more target characters to the set of recognition options.

6. The method of claim 1, wherein selecting the first neural network comprises:
- comparing the set of recognition options to the plurality of sets of confused graphemes;
- determining an intersection between the set of recognition options and each of the plurality of sets of confused graphemes;
- selecting a first set of the plurality of sets of confused graphemes, wherein the intersection between the set of recognition options and the first set of confused graphemes is greater than the intersection between the set of recognition options and each of a remaining one or more sets of confused graphemes; and
- determining that the first neural network is associated with the first set of the plurality of sets of confused graphemes.

7. The method of claim 6, wherein determining the intersection further comprises:
- ranking a set of recognition options, wherein top recognition options have a highest confidence levels; and
- determining the intersection between the first set of confused graphemes and the top recognition options from the ranked set of recognition options.

8. A computing apparatus comprising:
- a memory to store instructions; and
- a processing device, operatively coupled to the memory, to execute the instructions, wherein the processing device is to:
  - analyze a plurality of document images to construct a weighted graph that associates a plurality of pairs of confusing graphemes with a corresponding number of occurrences for each pair;
  - generate, using the weighted graph, a plurality of sets of confused graphemes based on recognition data for the plurality of document images, wherein each set of confused graphemes from the plurality of sets of confused graphemes comprises a plurality of different graphemes that are graphically similar to each other;
  - store a plurality of neural networks in memory, wherein each neural network of the plurality of neural networks is trained to recognize a set of confused graphemes from the plurality of sets of confused graphemes;
  - receive an input grapheme image associated with a document image comprising a plurality of grapheme images;
  - determine a set of recognition options for the input grapheme image, wherein the set of recognition options comprises a set of target characters that are similar to the input grapheme image;
  - select a first neural network from the plurality of neural networks, wherein the first neural network is trained to recognize a first set of confused graphemes, and wherein the first set of confused graphemes comprises at least a portion of the set of recognition options for the input grapheme image; and
  - determine a grapheme class for the input grapheme image using the selected first neural network.

9. The computing apparatus of claim 8, wherein to analyze the plurality of document images, the processing device is further to:
- collect statistical data associated with the recognition data for the plurality of document images;
- identify the plurality of pairs of confusing graphemes using the statistical data, wherein a first pair of confusing graphemes of the plurality of pairs comprises a first grapheme and a second grapheme that are graphically similar; and
- select a first set of confused graphemes using the weighted graph.

10. The computing apparatus of claim 9, wherein to select the first set of confused graphemes using the weighted graph, the processing device is further to:
- determine a set size for each of the plurality of sets of confused graphemes;
- determine a first weighted edge with a greatest weight value;
- identify a first pair of connected nodes that are connected by the first weighted edge;
- select, for the first set of confused graphemes, the graphemes associated with the first pair of connected nodes; and
- responsive to determining that a number of selected graphemes has not met the set size:
  - identify an additional node that is connected at least one of the nodes associated with the first pair of connected nodes, and
  - select, for the set of confused graphemes, the grapheme associated with the additional node.

11. The computing apparatus of claim 8, wherein the processing device is further to:
- train each neural network of the plurality of neural networks to recognize a corresponding set of confused graphemes.

12. The computing apparatus of claim 8, wherein to determine the set of recognition options for the input grapheme image, the processing device is further to:
- analyze the input grapheme image using a simple classifier;
- determine one or more target characters with characteristics that are similar to the input grapheme image; and
- assign the one or more target characters to the set of recognition options.

13. The computing apparatus of claim 8, wherein to select the first neural network, the processing device is further to:
- compare the set of recognition options to the plurality of sets of confused graphemes;
- determine an intersection between the set of recognition options and each of the plurality of sets of confused graphemes;
- select a first set of the plurality of sets of confused graphemes, wherein the intersection between the set of recognition options and the first set of confused graphemes is greater than the intersection between the set of recognition options and each of a remaining one or more sets of confused graphemes; and
- determine that the first neural network is associated with the first set of the plurality of sets of confused graphemes.

14. The computing apparatus of claim 13, wherein to determine the intersection, the processing device is further to:

rank a set of recognition options, wherein top recognition options have a highest confidence levels; and determine the intersection between the first set of confused graphemes and the top recognition options from the ranked set of recognition options.

15. A non-transitory computer readable storage medium, having instructions stored therein, which when executed by a processing device of a computer system, cause the processing device to perform operations comprising:

analyzing a plurality of document images to construct a weighted graph that associates a plurality of pairs of confusing graphemes with a corresponding number of occurrences for each pair;

generating, using the weighted graph, a plurality of sets of confused graphemes based on recognition data for the plurality of document images, wherein each set of confused graphemes from the plurality of sets of confused graphemes comprises a plurality of different graphemes that are graphically similar to each other;

storing a plurality of neural networks in memory, wherein each neural network of the plurality of neural networks is trained to recognize a set of confused graphemes from the plurality of sets of confused graphemes;

receiving an input grapheme image associated with a document comprising a plurality of graphemes;

determining a set of recognition options for the input grapheme image, wherein the set of recognition options comprises a set of target characters that are similar to the input grapheme image;

selecting, by the processing device, a first neural network from the plurality of neural networks, wherein the first neural network is trained to recognize a first set of confused graphemes, and wherein the first set of confused graphemes comprises at least a portion of the set of recognition options for the input grapheme image; and determining a grapheme class for the input grapheme image using the selected first neural network.

16. The non-transitory computer readable storage medium of claim 15, wherein analyzing the plurality of document images further comprises:

collecting statistical data associated with the recognition data for the plurality of document images;

identifying the plurality of pairs of confusing graphemes using the statistical data, wherein a first pair of confusing graphemes of the plurality of pairs comprises a first grapheme and a second grapheme that are graphically similar; and selecting a first set of confused graphemes using the weighted graph.

17. The non-transitory computer readable storage medium of claim 16, wherein selecting the first set of confused graphemes using the weighted graph comprises:

determining a set size for each of the plurality of sets of confused graphemes;

determining a first weighted edge with a greatest weight value;

identifying a first pair of connected nodes that are connected by the first weighted edge;

selecting, for the set of confused graphemes, the graphemes associated with the first pair of connected nodes; and responsive to determining that a number of selected graphemes has not met the set size:

identifying an additional node that is connected at least one of the nodes associated with the first pair of connected nodes, and selecting, for the set of confused graphemes, the grapheme associated with the additional node.

18. The non-transitory computer readable storage medium of claim 15, wherein determining the set of recognition options for the input grapheme image comprises:

analyzing the input grapheme image using a simple classifier;

determining one or more target characters with characteristics that are similar to the input grapheme image; and assigning the one or more target characters to the set of recognition options.

19. The non-transitory computer readable storage medium of claim 15, wherein selecting the first neural network comprises:

comparing the set of recognition options to the plurality of sets of confused graphemes;

determining an intersection between the set of recognition options and each of the plurality of sets of confused graphemes;

selecting a first set of the plurality of sets of confused graphemes, wherein the intersection between the set of recognition options and the first set of confused graphemes is greater than the intersection between the set of recognition options and each of a remaining one or more sets of confused graphemes; and determining that the first neural network is associated with the first set of the plurality of sets of confused graphemes.

20. The non-transitory computer readable storage medium of claim 19, wherein determining the intersection further comprises:

ranking a set of recognition options, wherein top recognition options have a highest confidence levels; and determining the intersection between the first set of confused graphemes and the top recognition options from the ranked set of recognition options.

* * * * *

UNITED STATES PATENT AND TRADEMARK OFFICE
CERTIFICATE OF CORRECTION

PATENT NO. : 10,565,478 B2
APPLICATION NO. : 15/625894
DATED : February 18, 2020
INVENTOR(S) : Aleksey Alekseevich Zhuravlev et al.

Page 1 of 1

It is certified that error appears in the above-identified patent and that said Letters Patent is hereby corrected as shown below:

On the Title Page

Item [72], Inventor 1 first and last name delete "Zhuravlev Aleskey Alekseevich" and insert
--Aleksey Alekseevich Zhuravlev--
Inventor 3 first and last name delete "Anisimovich Konstantin Vladimirovich" and insert --Konstantin Vladimirovich Anisimovich--
Inventor 4 first and last name delete "Davletshin Azat Aydarovich" and insert --Azat Aydarovich Davletshin--

Signed and Sealed this
Thirteenth Day of October, 2020

Andrei Iancu
*Director of the United States Patent and Trademark Office*